United States Patent
Malomsoky et al.

(10) Patent No.: US 8,229,453 B2
(45) Date of Patent: Jul. 24, 2012

(54) HOME ZONE SERVICE

(75) Inventors: Szabolcs Malomsoky, Szentendre (HU); István Szabó, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 255 days.

(21) Appl. No.: 12/525,241

(22) PCT Filed: Feb. 2, 2007

(86) PCT No.: PCT/EP2007/051049
§ 371 (c)(1), (2), (4) Date: Dec. 22, 2009

(87) PCT Pub. No.: WO2008/092507
PCT Pub. Date: Aug. 7, 2008

(65) Prior Publication Data
US 2010/0144346 A1 Jun. 10, 2010

(51) Int. Cl.
*H04W 72/00* (2009.01)

(52) U.S. Cl. ........ 455/453; 455/406; 455/407; 455/408; 455/409; 455/411; 455/418; 455/450; 455/451; 455/452.2; 455/436; 370/310.2; 370/322; 370/328; 370/332

(58) Field of Classification Search .......... 455/406–411, 455/418, 453, 450–452.2, 436–444; 370/310.2, 370/322, 328, 332
See application file for complete search history.

(56) References Cited

U.S. PATENT DOCUMENTS

| | | | | |
|---|---|---|---|---|
| 5,784,693 | A * | 7/1998 | Barber et al. | 455/434 |
| 5,956,644 | A * | 9/1999 | Miller et al. | 455/453 |
| 6,701,149 | B1 * | 3/2004 | Sen et al. | 455/436 |
| 7,480,237 | B2 * | 1/2009 | Nolle et al. | 370/229 |
| 7,839,882 | B2 * | 11/2010 | Soliman | 370/437 |
| 2005/0043034 | A1 * | 2/2005 | Abdel-Ghaffar et al. | 455/453 |
| 2007/0087745 | A1 * | 4/2007 | Poyhonen et al. | 455/432.1 |
| 2008/0214143 | A1 * | 9/2008 | Heit et al. | 455/405 |
| 2009/0163223 | A1 * | 6/2009 | Casey | 455/453 |

FOREIGN PATENT DOCUMENTS
JP H10-336148 A 12/1998

* cited by examiner

*Primary Examiner* — Steve D Agosta

(57) ABSTRACT

A system for determining a Home Zone service availability within a cell in a cellular communications network, wherein users of said cell comprise Home Zone users for whom services are provided at special Home Zone subscription rates when the user is in the cell, and non-Home Zone users. The system comprises measuring means for measuring total usage within the cell, and determining means for determining from said measurements and one or more Home Zone user usage profiles whether a further Home Zone user can be added to the cell.

19 Claims, 4 Drawing Sheets

HOME ZONE SERVICE

TECHNICAL FIELD

The present invention relates to a system and method for measurement-based Home Zone Service provisioning in a cellular communications network.

BACKGROUND

Mobile phone cellular network operators seek to foster fixed to mobile substitution, in which users are encouraged to switch from a fixed cable or wire Digital Subscriber Line (DSL) to a mobile network. One way of encouraging substitution is by offering users Home Zone services, where phone calls and data services are much cheaper when the user is in their Home Zone cell than in other cells. Home Zone services for voice calls are becoming popular with some operators (e.g., O2's Genion™ service in Germany). A key prerequisite is to offer the service such that it really 'emulates' the fixed service (e.g., Genion users are allocated both a mobile number and a fixed number). Callers to the fixed number pay standard fixed network call rates. Genion subscribers can choose what happens to calls to their fixed number when they are outside their Home Zones: calls can be forwarded to voicemail for free or to the mobile number for an additional fee.

Today, the availability of a Home Zone service depends on the coverage of 3G networks (voice Home Zone can be offered using 2G networks as well). However, many subscribers opt to keep their fixed lines because these are used for Internet access. When it comes to Internet access, the capabilities of mobile networks are still far behind that of DSL or cable networks. While achievable data rates are comparable with average-speed DSL, cell capacities are limited, which makes providing Internet access over mobile networks relatively expensive for the mobile network operator. Operators hope that with High Speed Packet Access (HSPA) technology they can become a true competitor of DSL operators, but analysis shows that the possibilities of this are still limited.

One reason for this is that, in contrast with access to DSL systems, in a mobile network the connection to the first aggregation point (i.e., the base station) is a shared resource. Thus, availability is not simply a question of coverage. Network capacity is a limitation as well. In other words, the Home Zone service availability is determined by both 3G network coverage and capacity. As a result, operators will be forced to find ways of limiting demand to actually available capacity. Since the cell resource is shared among users within a cell, an operator may limit the number of Home Zone Internet access subscribers within a cell to avoid cell overload. However, setting such a static limit on the maximum number of subscribers per cell is difficult and can lead to under or over utilization of the network at many zones. User behaviour is highly variable (e.g., there are orders of magnitude differences in the traffic demands of light and heavy users, and also the number of non-Home Zone users can vary widely between cells—see, for example, "The Impact and Implications of the Growth in Residential User-to-User Traffic" by Kenjiro Cho, IIJ Kensuke Fukuda, National Institute of Informatics Hiroshi Esaki, The University of Tokyo Akira Kato, The University of Tokyo ACM Sigcomm 2006). This means that quality of service can be impaired in some cells where cell capacity has been reached, while there is spare capacity in other cells. An impaired quality of service means that users experience a slower response and longer download times.

SUMMARY

It is an object of the present invention to provide a system that enables development and management of Home Zone Services in a controlled way, such that good quality of service is ensured, while high network utilization is achieved.

According to a first aspect of the present invention there is provided a system for determining a Home Zone service availability within a cell in a cellular communications network, wherein users of said cell comprise Home Zone users for whom services are provided at special Home Zone subscription rates when the user is in the cell, and non-Home Zone users, the system comprising:
  measuring means for measuring total usage within the cell; and
  determining means for determining from said measurements and one or more Home Zone user usage profiles whether a further Home Zone user can be added to the cell.

The invention relates in particular to cellular networks which provide users with shared wireless IP access, e.g. networks providing HSPA.

An advantage of the invention is that the system can provide an improved service availability map with capacity information based on cell-level measurement of Home Zone as well as non-Home Zone Internet traffic. A further advantage is that network operators can identify cells that have available capacity to admit new Home Zone subscribers.

A typical system according to the present invention will comprise a database for storing Home Zone service availability information, and in particular information regarding cell throughput capacities and registered Home Zone user identities.

The system may be integrated into a mobile network operator's management system. Queries regarding the availability of a Home Zone service within a network cell may be sent from a sales terminal to said determining means. The result is returned by the system to the sales terminal, whereupon a sales person (or automated subscription service) can make a decision upon whether or not to proceed with a sale.

A preferred embodiment of the invention comprises a second measuring means for measuring cell usage for existing Home Zone users.

A preferred embodiment of the invention builds typical usage profiles for existing Home Zone users in an empirical fashion. Said determining means is arranged to allocate each Home Zone user to one of a plurality of user categories. The category boundaries may be adjusted dynamically (and categories added and removed), based upon measurement data. Cell ability to cope with an additional Home Zone user or users can be determined by predicting the effect that an additional user or user will have on the network, based upon the typical usage profiles.

Said determining means is preferably arranged to add the or each Home Zone user usage profiles to the total cell usage to determine whether a further Home Zone user can be added to the cell, and the result(s) of the addition(s) compared against the cell capacity.

In an alternative embodiment of the present invention, the or each Home Zone user usage profile is a fixed value which is added to the measured total usage within the cell and the result compared against the cell capacity.

According to a second aspect of the present invention there is provided a method of determining a Home Zone service availability of a cell in a cellular communications network wherein users of the cell comprise Home Zone users, for whom services are provided at special Home Zone subscription rates when the user is in the cell, and non-Home Zone users, the method comprising:

measuring total usage within the cell; and determining from said measurements and one or more Home Zone user usage profiles whether a further Home Zone user can be added to the cell.

Preferably, the method comprises measuring cell usage for existing Home Zone users. Said step of determining comprises determining a Home Zone user usage profile for one or more Home Zone user categories using the measurement results. Home Zone users are allocated to a category to allow usage data for that category to be measured. For the or each category, the Home Zone user usage profile is added to the total cell usage and a determination made as to whether the cell can be loaded with such an additional user.

The steps of the method may all be carried out on an ongoing basis. Alternatively, at least the final, determining step, may be made upon demand from a sales terminal or the like processing an application from a user to subscribe to a Home Zone service. If admitted, a new user is added as a Home Zone user to a chosen one of the categories.

According to a third aspect of the present invention there is provided a system terminal comprising:

means for receiving an enquiry to admit a new subscriber to a cellular communications network as a Home Zone user in a specified cell of said network;

means for receiving an indication of Home Zone service availability for said specified cell based on measurements of resource utilisation in said cell by all users of said network; and means for admitting said new subscriber to said network as a Home Zone subscriber in said specified cell in accordance with said indication.

Preferably, said received indication of Home Zone service availability is additionally based upon resource utilisation by Home Zone users in said cell.

DETAILED DESCRIPTION

As already set out above, operators of cellular networks would like to be able to offer users, resident within a particular cell of a cellular telephone network, discounted tariffs as compared to tariffs charged to users active in that cell but resident in another cell. For the purpose of this discussion, the former are referred to as "Home Zone" users whilst the latter are referred to as "visiting" users.

Figure 1:
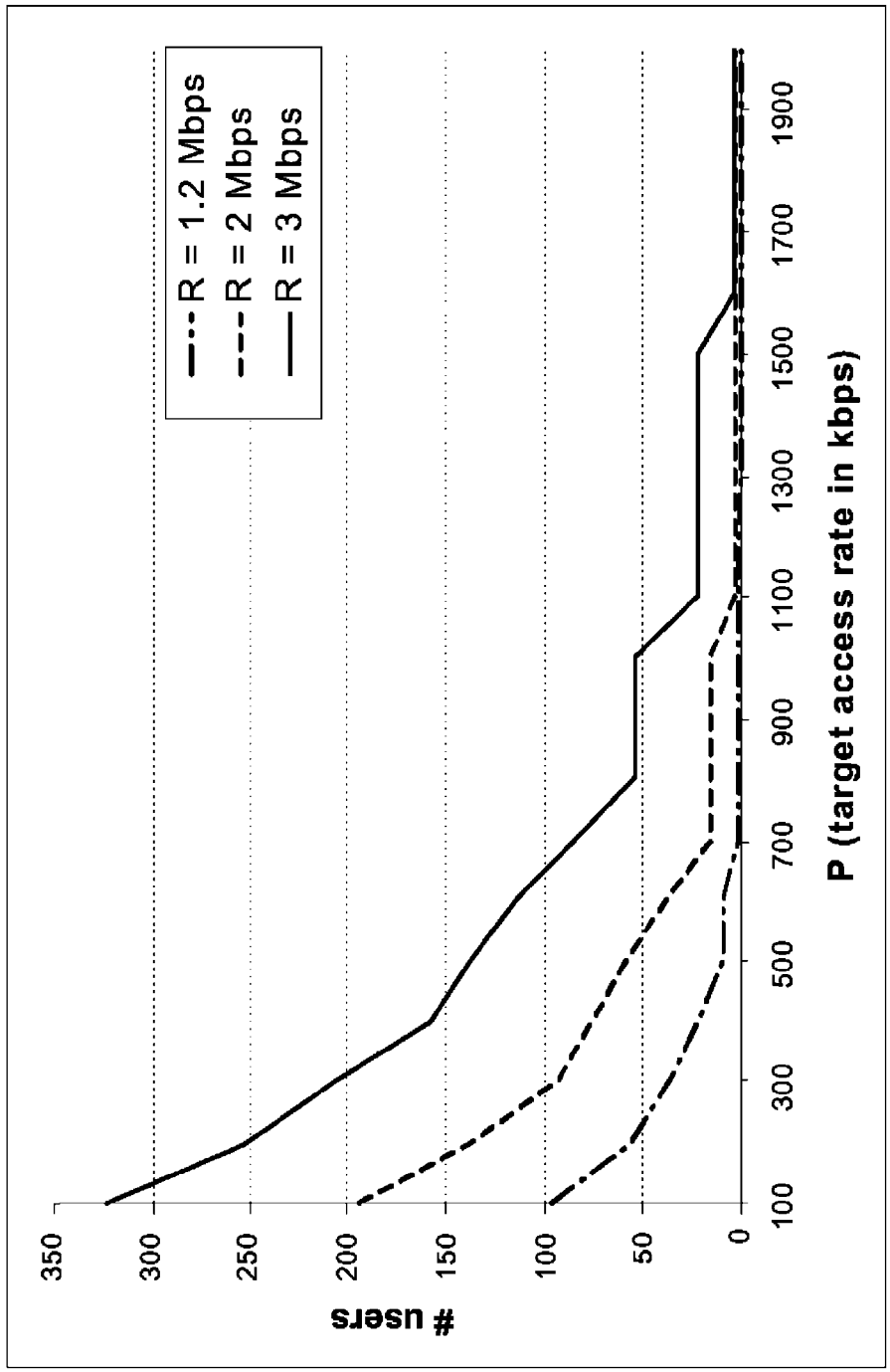
FIG. 1 is a graph showing cell user population against a target access rate for three different values of cell throughput capacity.

FIG. 1 is a graph showing the population (approximate number of users) that can share one cell at a target access rate P, if each user downloads 1 Gbyte per month (referred to hereafter as the user load value). The data are shown for three different values of cell throughput capacity R (Mbytes per second) and the lines on the graph are based on a probability of less than 1% that the access rate seen by a user is smaller than P. User activity is assumed to occur according to a Poisson distribution. It will be readily appreciated that, for a given cell capacity R, the number of users allowed to access the cell declines as the (guaranteed) access rate increases.

Figure 2:
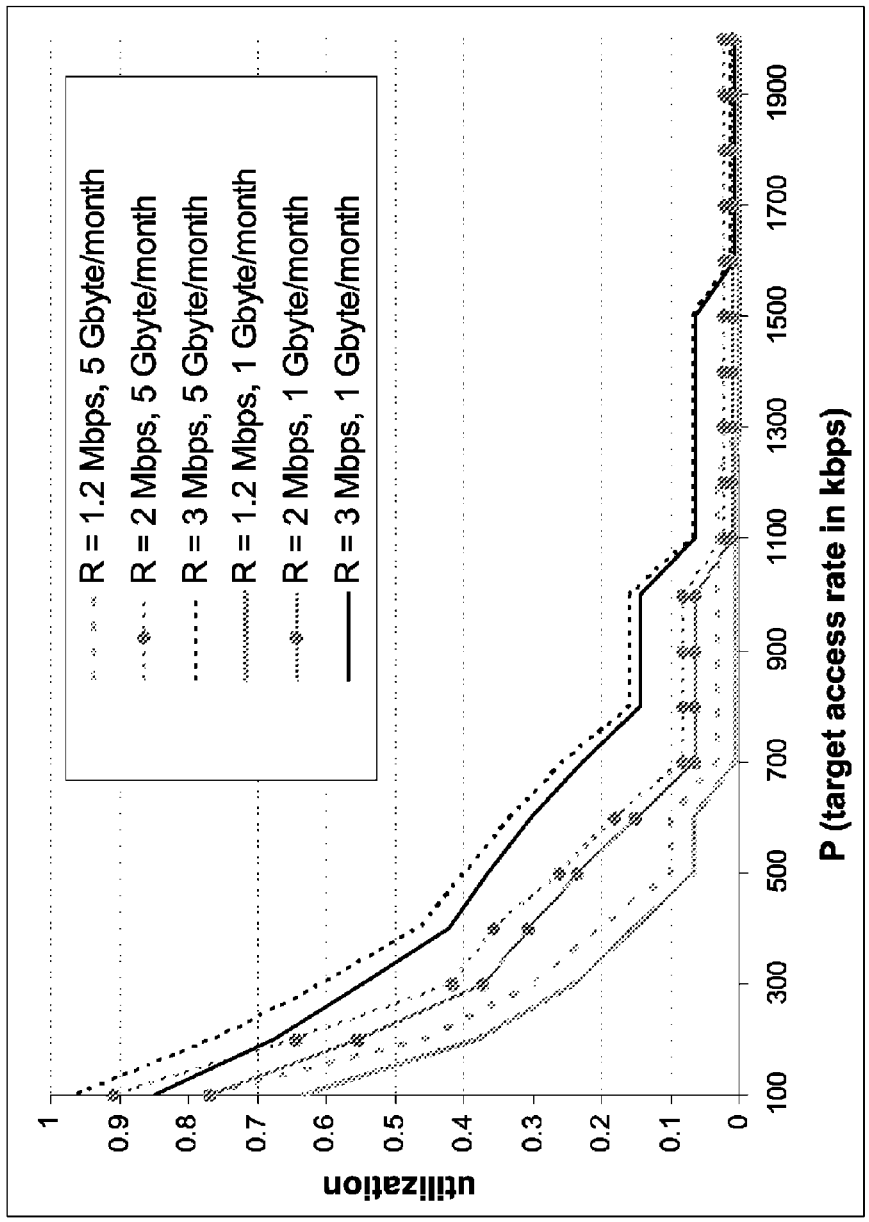
FIG. 2 is a graph showing the allowed resource utilization of a cell depending on the target access rate.

Referring now to FIG. 2, this shows the resource utilization of a cell (where 1 equals 100% utilization) depending on the target access rate. As in FIG. 1, the lines on the graph indicate a probability of less than 1% that the access rate seen by a user is less than P. Again, R represents the total cell capacity, and it is assumed that each user generates 1 or 5 Gbyte traffic per month, with user activity occurring according to a Poisson distribution. Considering the case where R=2 Mbps and the target access rate is 500 kbps, then it can be seen from the Figure that the allowed cell utilization is around 25% for a wide range of user load values (1-5 Gbyte/month). FIG. 2 demonstrates that, where an operator guarantees fewer users a higher quality of service, network utilisation is reduced. On the other hand, where a greater number of users are guaranteed a lower quality of service, network utilisation is increased.

It will be appreciated that the number of active users as well as user behaviour are subject to large variations between cells, and will change over time. Limiting all cells to the same maximum number of Home Zone users (the number being determined to leave sufficient spare capacity for visiting users) would likely result in over utilisation of some cells and under utilisation of others. A better approach is to monitor Home Zone user behaviour on a per cell basis in order to determine typical use profiles. When it is desired to add a further Home Zone user, the expected increase in cell use can be added to historical (total) cell use data and compared against the total cell capacity to determine if the new user can be accommodated and, if so, what restrictions if any should be placed upon the user's access.

Figure 3:
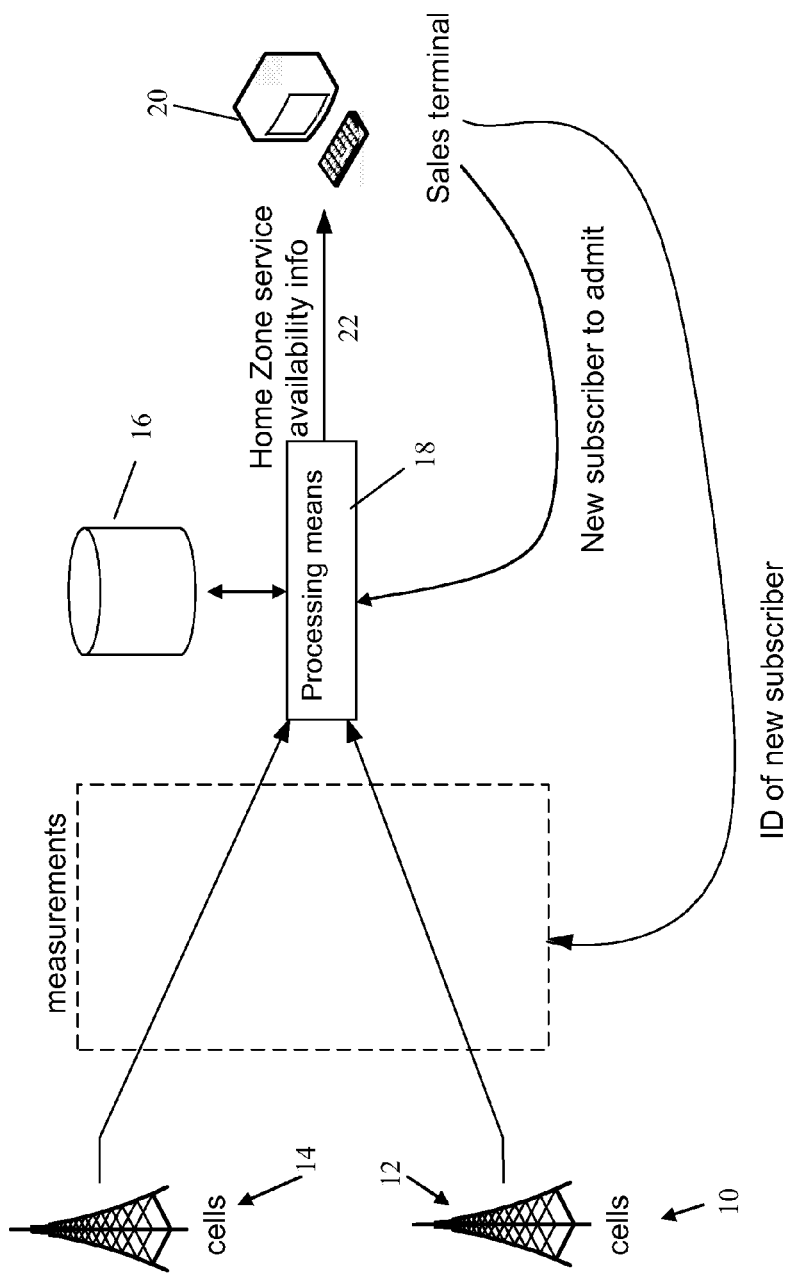
FIG. 3 shows schematically one embodiment of a system according to the invention.

FIG. 3 shows schematically the elements of a system for allocating new Home Zone users within a cellular network, as well as the element functions/interactions. As shown in FIG. 3, a network 10 comprises a plurality of cells, of which two cells 12, 14 are shown. Cell-level measurements are performed in the network 10. These measurements are preferably done by the management system of the mobile network (not shown), but also external measurement equipment can be used, i.e. equipment that is external to the operator's network management system. The system includes a central database 16 and a processor 18 (which may be, but do not have to be, in the same location, or part of the same hardware component). The identities of Home Zone users are contained in the database.

In a preferred embodiment, the measurements for each cell are the following:

1. The total cell resource utilization daily profile for each cell (the database stores a smoothed measurement that is updated every day, weekdays and weekends can be stored separately);
2. Usage patterns for Home Zone users in the form of a daily profile with up/downloaded Kbytes/hour. Users are allocated to categories which reflect similar use patterns, e.g. using unsupervised learning techniques. The number and definitions of categories may be adjusted dynamically. Data clustering techniques are described in general in: A. K. Jain, M. N. Murty, P. J. Flynn: Data Clustering: A Review, ACM Computing Surveys, Vol. 31, No. 3, pp. 264-323, September 1999.

Over time, the processor "averages out" measurement data to produce cell resource utilisation profiles for the days of the week, Monday to Sunday. Similarly, averaged weekly profiles are produced for each user categories. The resulting profiles are stored in the database 16, and are dynamically updated.

The data stored in the database 16 includes the cell throughput capacity and the identities of currently registered home zone users. Threshold values of network usage may be used to determine the levels of usage that form the category boundaries. Alternatively, a rule or algorithm may be used to determine the category boundaries depending on factors such as the mix of services or applications used, the volume of data transferred, or the time of day that the service is used by users.

The system embodiment illustrated in FIG. 3 includes a Sales terminal 20 with a data link 22 to the processor 18 across which Home Zone Service availability information is provided to the Sales Terminal 20. In a simplified version of this embodiment, when a new subscriber wants to sign up for the Home Zone service, an enquiry is entered (e.g. by a Sales staff member) at the Sales terminal 20, specifying the Home Zone location (e.g. the address or home location of the new subscriber). This information is sent across the data link 22 to the processor 18. The information is received at the processor 18, which then retrieves appropriate data from the database 16 and manipulates the data. More particularly, the processor adds each cluster profile separately to the total cell utilization for a one week period. If the result exceeds capacity at any time during the period for any given cluster, the processor flags that cluster to indicate this. If the result approaches the limit within some predefined margin, e.g. 95%, again the cluster is flagged to indicate this. If neither condition is met, the cluster is flagged as such. Based upon these results, the processor classes the cell as one of the following:

Home Zone Service Allowed: the new subscriber can admitted.

Home Zone Service Not Available: the new subscriber cannot be admitted.

Home Zone Service Allowed with Restrictions: the new subscriber may be admitted with a restricted usage limit.

The determined cell class is communicated by the processor 18 back to the sales terminal 20. If the new Home Zone subscriber is admitted based upon the result, this is communicated by the sales terminal back to the processor, which adds the identity of the user to the list of Home Zone users in the database 16 and for which specific measurements are made. [The new user may be allocated to a default profile category, and subsequently moved to an appropriate category once sufficient data for the user has been collected and analysed.]

Figure 4:
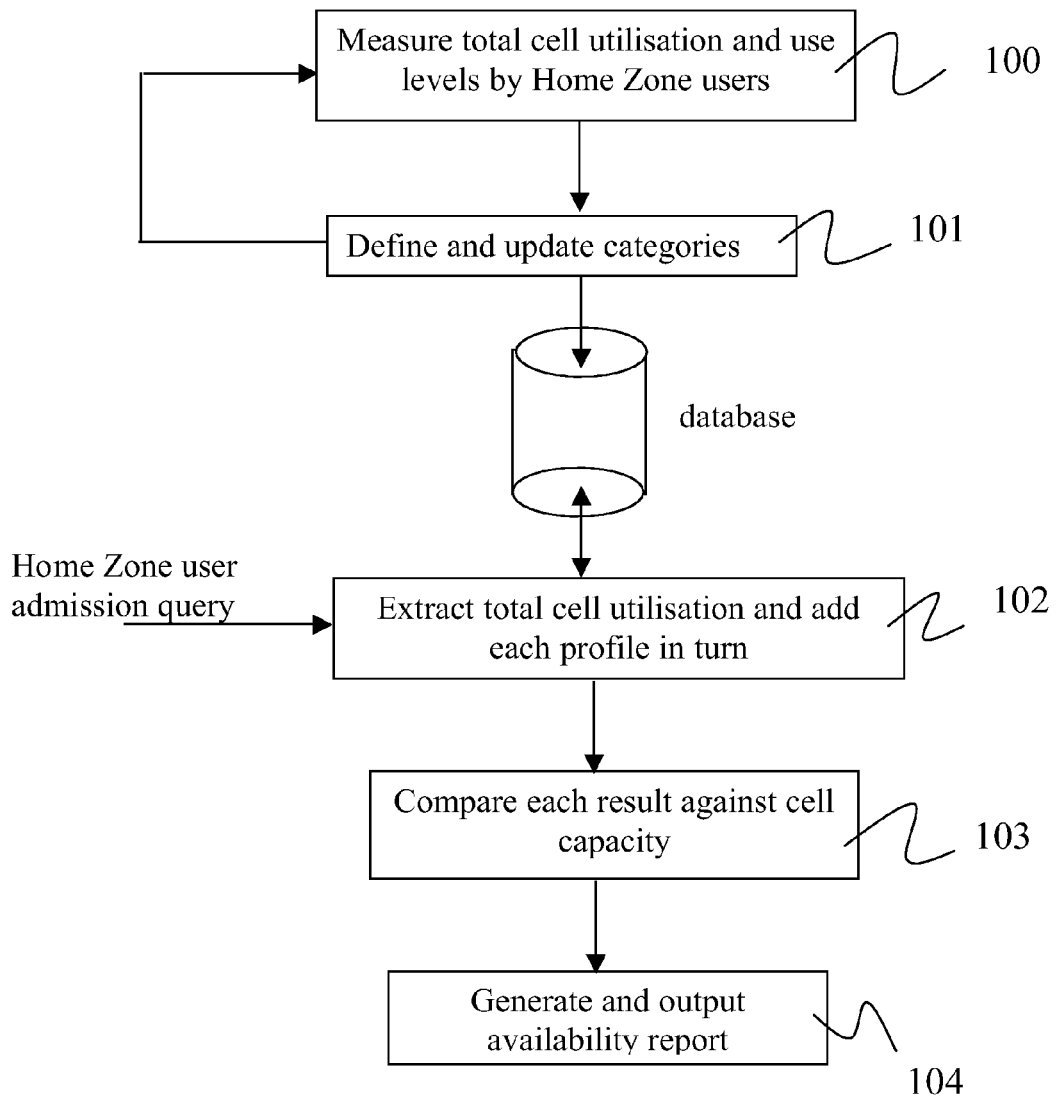
FIG. 4 is a flow diagram illustrating a Home Zone availability determination procedure according to an embodiment of the invention.

FIG. 4 is a flow diagram illustrating the Home Zone user availability determination procedure described above, where the steps illustrated are those of measurement (100), define and update categories (101), combine total usage and category profiles (102), comparison against capacity (103), and reporting (104).

The invention allows a smooth introduction of Home Zone services, because the quality of the Home Zone Internet access service is automatically maintained. If a new cell or new user enters the system, the database automatically registers this and enables the provisioning algorithm to take this into account. It enables the extension of service availability information with available capacity information. This is a new and valuable improvement over today's coverage maps because—in contrast with DSL access—the connection to the first aggregation point (i.e., the base station in the mobile case) is a shared resource, thus availability is not simply a question of coverage.

The system and method of the present invention allows service penetration (the number of users taking up the service) to be controlled not just by pricing (as in known methods), but also by direct measurements of the usage. It is therefore possible to further reduce prices of Home Zone services, thus attracting more users and accelerating fixed to mobile substitution without the risk of heavy system overload.

It will be appreciated by the person of skill in the art that various modifications may be made to the above described embodiments without departing from the scope of the present invention. For example, whilst mention has been made above of the HSPA access technology, the invention can be applied to other access technologies, for example Wimax, CDMA EVDO revisions, and 3GPP LTE access architectures.

The invention claimed is:

1. A system for determining a Home Zone service availability within a cell in a cellular communications network, wherein users of said cell comprise Home Zone users for whom services are provided at special Home Zone subscription rates when the user is in the cell, and non-Home Zone users, the system comprising:
measuring means for measuring total usage within the cell;
a second measuring means for measuring cell usage for existing Home Zone users, and means for determining said Home Zone user usage profiles;
determining means for determining from said measurements and one or more Home Zone user usage profiles whether a further Home Zone user can be added to the cell;
allocation means for allocating each Home Zone user to one of a plurality of user categories as well as determining for each of the plurality of user categories a typical home zone user profile; and
reallocation means for dynamically reallocating Home Zone users to categories based upon the measurement result.

2. The system according to claim 1, further comprising a database for storing Home Zone service availability information.

3. The system according to claim 2, wherein the data stored in the database includes information regarding cell throughput capacities.

4. The system according to claim 1, wherein the measuring and determining means form a part of a management system of the mobile network.

5. The system according to claim 1, wherein the measuring and determining means comprise measurement equipment external to the network management system of the operator.

6. The system according to claim 1, wherein said determining means is arranged to determine one or more typical Home Zone user categories and to determine a Home Zone user profile for each category.

7. The system according to claim 1, wherein said determining means is arranged to dynamically adapt the category definitions based upon the measurement results.

8. The system according to claim 6, wherein said determining means is arranged to add each user profile to the total cell usage to determine whether a further Home Zone user can be added to the cell.

9. The system according to claim 8, wherein the result of the addition is compared against the cell capacity.

10. The system according to claim 1, wherein said first and second measuring means are arranged to provide usage patterns in the form of a daily profile of up/downloaded bytes/hour.

11. The system according to claim 1, wherein said determining means is arranged to indicate as an availability category one of: Home Zone Service Allowed; Home Zone Service Allowed with Restrictions; and Home Zone Service Not Available.

12. The system according to claim 1, further comprising a sales terminal with a data link to said determining means, across which link Home Zone Service availability information is provided to the sales terminal.

13. A method of determining a Home Zone service availability of a cell in a cellular communications network wherein users of the cell comprise Home Zone users, for whom services are provided at special Home Zone subscription rates when the user is in the cell, and non-Home Zone users, the method comprising:
   measuring total usage within the cell;
   measuring cell usage for existing Home Zone users, and determining said Home Zone user usage profiles;
   determining from said measurements and one or more Home Zone user usage profiles whether a further Home Zone user can be added to the cell
   allocating each of the Home Zone users to one of a plurality of user categories,
   determining for each of the plurality of user categories a typical home zone user profile; and
   dynamically reallocating Home Zone users to categories based upon the measurement result.

14. The method according to claim 13 and comprising measuring usage for existing Home Zone service users.

15. The method according to claim 14, wherein said step of determining comprises determining a typical Home Zone user usage profile for one or more Home Zone user categories using the measurement results.

16. The method according to claim 15, wherein said step of determining further comprises, for the or each category, adding the typical Home Zone user usage profile to the total cell usage and determining whether the cell can be loaded with such an additional user.

17. The method according to claim 15, wherein a plurality of Home Zone user categories are defined corresponding to different levels and or patterns of use, and said step of determining comprises determining to which category a new Home Zone user may be added.

18. The method according to claim 13, wherein said step of determining is carried out, at least in part, in response to the entering of an enquiry at a sales terminal to request admission of a new subscriber to the Home Zone service in said cell, the request admission being sent to a measurement system where the measuring and determining steps are performed, the method further comprising returning the result of said determination from the measuring system to the sales terminal.

19. The method according to claim 17, wherein if the new subscriber is admitted by the provisioning process, then an identifier of the new Home Zone subscriber is communicated to the measurement system in order to include the new subscriber in subsequent measurements.

* * * * *

UNITED STATES PATENT AND TRADEMARK OFFICE
CERTIFICATE OF CORRECTION

| | | |
|---|---|---|
| PATENT NO. | : 8,229,453 B2 | Page 1 of 1 |
| APPLICATION NO. | : 12/525241 | |
| DATED | : July 24, 2012 | |
| INVENTOR(S) | : Malomsoky et al. | |

It is certified that error appears in the above-identified patent and that said Letters Patent is hereby corrected as shown below:

In Column 7, Line 21, in Claim 13, delete "cell" and insert -- cell; --, therefor.

Signed and Sealed this
Thirteenth Day of November, 2012

David J. Kappos
*Director of the United States Patent and Trademark Office*